United States Patent
Rohanimanesh et al.

(10) Patent No.: US 12,447,631 B2
(45) Date of Patent: Oct. 21, 2025

(54) AUTOMATED ROBOTIC TOOL SELECTION

(71) Applicant: Osaro, San Francisco, CA (US)

(72) Inventors: Khashayar Rohanimanesh, San Francisco, CA (US); Jacob Charles Metzger, San Francisco, CA (US); William Davidson Richards, San Francisco, CA (US)

(73) Assignee: Osaro, San Francisco, CA (US)

( * ) Notice: Subject to any disclaimer, the term of this patent is extended or adjusted under 35 U.S.C. 154(b) by 251 days.

(21) Appl. No.: 17/902,587

(22) Filed: Sep. 2, 2022

(65) Prior Publication Data

US 2023/0081119 A1 Mar. 16, 2023

Related U.S. Application Data

(60) Provisional application No. 63/243,464, filed on Sep. 13, 2021.

(51) Int. Cl.
*B25J 15/04* (2006.01)
*B25J 9/16* (2006.01)

(52) U.S. Cl.
CPC ........... *B25J 15/0408* (2013.01); *B25J 9/163* (2013.01); *B25J 9/1653* (2013.01)

(58) Field of Classification Search
CPC ....... B25J 15/0408; B25J 9/163; B25J 9/1653
See application file for complete search history.

(56) References Cited

U.S. PATENT DOCUMENTS

| | | | |
|---|---|---|---|
| 9,475,198 B2 | 10/2016 | Mishra | |
| 9,504,527 B2 | 11/2016 | Smaby | |
| 9,630,315 B2 | 4/2017 | Cookson | |
| 10,500,735 B1 | 12/2019 | Menon | |
| 10,625,432 B2 | 4/2020 | Wagner | |
| 10,766,136 B1* | 9/2020 | Porter | G06N 3/045 |
| 2018/0044888 A1* | 2/2018 | Chi | G06F 16/2455 |
| 2019/0389062 A1 | 12/2019 | Truebenbach | |

(Continued)

FOREIGN PATENT DOCUMENTS

| | | |
|---|---|---|
| EP | 1711317 B1 | 8/2008 |
| EP | 3235606 A1 | 10/2017 |

(Continued)

OTHER PUBLICATIONS

"Sparse tree search optimality guarantees in POMDPs with continuous observation spaces"; arXiv:1910.04332v3 (Year: 2020).*

(Continued)

*Primary Examiner* — Jason Holloway
*Assistant Examiner* — Christopher A Buksa
(74) *Attorney, Agent, or Firm* — Blueshift IP; Robert Plotkin

(57) ABSTRACT

A computer system automatically selects robot end-effectors for pick-and-place applications using a model-predictive control algorithm. The system may select an end-effector to replace an existing end-effector in order to optimize (or at least increase) throughput. The system uses a predictive model of reward, where reward of each potential grasp for each end tool is parameterized by a deep neural network. The system may also use a variety of metrics to evaluate the performance of the tool-selection algorithm, and thereby improve performance of the system.

24 Claims, 7 Drawing Sheets

(56) References Cited

U.S. PATENT DOCUMENTS

| | | | |
|---|---|---|---|
| 2020/0030994 A1* | 1/2020 | Wagner | B25J 15/0408 |
| 2020/0316782 A1 | 10/2020 | Chavez | |
| 2021/0069904 A1 | 3/2021 | Duan | |
| 2021/0181716 A1 | 6/2021 | Quinlan | |
| 2022/0072707 A1* | 3/2022 | Fan | G06T 7/73 |
| 2023/0020503 A1* | 1/2023 | Rahman | G05D 1/0221 |

FOREIGN PATENT DOCUMENTS

| | | |
|---|---|---|
| IN | 201747016579 A | 5/2017 |
| JP | H09174474 A | 7/1997 |
| JP | 3435081 | 8/2003 |
| JP | 5130509 | 1/2013 |
| JP | 2019202357 A | 11/2019 |
| WO | 2018187067 | 10/2018 |
| WO | 2020021643 A1 | 1/2020 |
| WO | 2021081388 A1 | 4/2021 |

OTHER PUBLICATIONS

Jeffrey Mahler et al., "Learning ambidextrous robot grasping policies," Science Robotics, 4(26), Jan. 16, 2019, 12 pages. doi: 10.1126/scirobotics.aau4984. URL https://robotics.sciencemag.org/content/4/26/eaau4984.

E. F. Camacho et al., "Model predictive control," Book series: Advanced Textbooks in Control and Signal Processing, Springer Science Business Media, published by Springer-Verlag London Limited 1995, ISBN: 978-0-85729-398-5, 300 pages.

Chelsea Finn et al., "Deep visual foresight for planning robot motion," CoRR, abs/1610.00696, 2016, 8 pages. Available online via URL http://arxiv.org/abs/1610.00696.

Aviv Tamar et al., "Learning from the hindsight plan—episodic MPC improvement," CoRR, abs/1609.09001, 2016, 9 pages. Available online URL http://arxiv.org/abs/1609.09001.

A. Zeng et al., "Robotic pick-and-place of novel objects in clutter with multi-affordance grasping and cross-domain image matching," in 2018 IEEE international conference on robotics and automation (ICRA), pp. 3750-3757. IEEE, 2018.

I. Lenz et al, "Deep learning for detecting robotic grasps," The International Journal of Robotics Research, 34(4-5):705-724, 2015.

S. Levine et al., "Learning hand-eye coordination for robotic grasping with deep learning and large-scale data collection," Mar. 2016the International Journal of Robotics Research 37(10), 12 pages, DOI:10.1177/0278364917710318.

J. Redmon et al., "Real-time grasp detection using convolutional neural networks," 2015 IEEE International Conference on Robotics and Automation (ICRA), 7 pages.

S. J. Russell et al., "Artificial intelligence: A modern approach," Prentice Hall, Englewood Cliffs, New Jersey USA, 1995, 1151 pages.

F. Ebert et al., "Self-supervised visual planning with temporal skip connections," 1st Conference on Robot Learning (CoRL 2017), Mountain View, United States. 13 pages.

A. Xie et al., "Improvisation through physical understanding: Using novel objects as tools with visual foresight," Robotics: Science and Systems 2019, Freiburg im Breisgau, Jun. 22-26, 10 pages.

D. Bertsekas, "Dynamic programming and optimal control," vol. 1. Athena scientific, Belmont Massachusetts USA, 2012 47 pages.

G. B. Dantzig et al., "Solution of a Large-Scale Traveling-Salesman Problem," RAND Corporation, Santa Monica, CA, 1954, 36 pages.

C. Miller et al., "Integer programming formulations and traveling salesman problems," Journal of Association for Computing Machinery, 7:326-329, 1960.

"Gurobi Optimizer Reference Manual," Gurobi Optimization, LLC, 2022, 44 pages. URL https://www.gurobi.com/documentation/9.1/refman/index.html.

R. Baeza-Yates et al., "Modern information retrieval," vol. 463. ACM press, New York, 1999, 38 pages.

B. Goodrich et al., "Depth by poking: Learning to estimate depth from self-supervised grasping," CoRR, abs/2006.08903, 2020. URL https://arxiv.org/abs/2006.08903.

T. Lin et al., "Feature pyramid networks for object detection," in 2017 IEEE Conference on Computer Vision and Pattern Recognition (CVPR), pp. 936-944, 2017. doi:10.1109/CVPR.2017.106.

* cited by examiner

Algorithm 1 Integer Linear Program (ILP)

1: Objective: $v^* = \max_{\omega_{ij}} \sum \omega_{ij} r_{ij} \omega_{ij}$ s.t.
2: $\omega_{ij} \in \{0,1\}, \forall i,j \in \mathcal{V}$ ▷ binary variables representing edges in the solution
3: $\sum_{j \in \mathcal{V} \setminus \{s,e\}} \omega_{sj} = 1$ ▷ constraint enforcing one outgoing edge from the initial node $s$
4: $\sum_{i \in \mathcal{V} \setminus \{s,e\}} \omega_{ie} = 1$ ▷ constraint enforcing one incoming edge to the terminal node $e$
5: $\sum_{ij \in \mathcal{V} \setminus \{s,e\}} \omega_{ij} = H$ ▷ constraint enforcing the trajectory length to be exactly $H$
6: $\sum_{j \in \mathcal{V} \setminus \{s,i,e\}} \omega_{ij} = \sum_{j \in \mathcal{V} \setminus \{e,i,s\}} \omega_{ji}, \forall i \in \mathcal{V} \setminus \{s,e\}$
7: $\sum_{j \in \mathcal{V} \setminus \{s,i,e\}} \omega_{ij} \leq 1, \forall i \in \mathcal{V} \setminus \{s,e\}$ ▷ Steps 6 and 7 specify constraints enforcing the flow conservation
8: $\omega_{ij} + \omega_{ji} \leq 1, \forall i, j \in \mathcal{V}, \text{ if } \|o_i^{\psi} - o_j^{\psi}\| \leq \|o_i^{\psi} - o_j^{\psi}\|, \forall i, j \in \mathcal{V} \setminus \{s,e\}$ ▷ $l$-separation
constraints (see text)
9: $u_i \in \{0,1,2,\ldots,|\mathcal{V}|\}, \forall i \in \{1,\ldots,|\mathcal{V}|\}$
10: $u_1 = 1$ and $u_n = |\mathcal{V}|$
11: $u_i - u_j + (H+1)(1 - \omega_{ij}) \leq |\mathcal{V}| - 1, \forall i, j \in \{2,\ldots,|\mathcal{V}|-1\}$ ▷ steps 9-11 specify
Miller-Tucker-Zemlin (MTZ) sub-tour elimination constraints

FIG. 3A

Algorithm 2 Sparse Tree Search (STS)

1: function STS($s_t$, $H$, $c$, $l$, $k$) ▷ current state $s_t = \langle \Omega_t, \Gamma_t \rangle$; horizon $H$, tool changing costs $c < 0$, void radius $l$, $k$ is the sparsity factor where it specifies the top $k$ grasp proposals per end-effector to be included for the search tree node expansion
2:     if $H = 0$ then
3:         return $(\_, 0)$
4:     end if
5:     $\Xi \leftarrow \emptyset$
6:     Let $\Lambda_t^k \subset \Omega_t$ be the union of the top $k$ grasp proposals per end-effector (in terms of grasp score $\omega.p$) available in $\Omega_t$
7:     for $\omega \in \Lambda_t^k$ do
8:         $s_{t+1} = \mathcal{T}_f(s_t, \omega)$     ▷ $\omega = \langle \mathcal{E}, u, p \rangle$
9:         $(\omega^+, v_{\omega^+}) \leftarrow \text{STS}(s_{t+1}, H-1, c, l, k)$     ▷ forward dynamics in Equation 2
10:        $v_\omega = \mathcal{R}(s_t, \omega) + v_{\omega^+}$     ▷ reward function defined in Equation 1
11:        $\Xi \leftarrow \Xi \cup (\omega, v_\omega)$
12:     end for
13:     return $\text{argmax}_{v_\omega}(\Xi)$
14:
15: end function

FIG. 3B

Algorithm 3 Synthetic Experiments

1: function GENERATEGRASPMODEL($\langle H, W \rangle, \{p^i\}_{i=1}^m$)
2:     Inputs: $\langle H, W \rangle$ are the height and the width of the grasp map, $m$ positions $p^i = (p_x^i, p_y^i)$ where $0 \leq p_x^i \leq W - 1$ and $0 \leq p_y^i \leq H - 1$ (mimicking object positions)
3:     set $\mathcal{G} \leftarrow \mathbf{1}_{H \times W}$
4:     for $i = 1, \ldots, m$ do
5:         Sample a random standard deviation $\sigma_i \in [0, 1]$ and a scale $\beta_i \in [0, 1]$
6:         Update: $\mathcal{G} \leftarrow \mathcal{G} \times \beta_i \mathcal{N}(p_i, \sigma_i)$
7:     end for
8:     return $\mathcal{G}$
9: end function
10:
11: function RUNEXPERIMENT($N, \langle H, W \rangle, m, n_{ee}, h, k, l, c$)
12:     Inputs: number of episodes $N$, number of end-effectors $\langle H, W \rangle$ are the height and the width of the synthetic grasp map, $m$ number of object centers, number of end-effectors $n_{ee}$, horizon $h$, sparsity factor $k$, void radius $l$, tool changing costs $c < 0$
13:     for $i = 1, 2, \ldots, N$ do
14:         Select a random end-effector $\mathcal{E} \in \{1, \ldots, n_{ee}\}$
15:         Sample $m$ random object centers $\{p^i\}_{i=1}^m$
16:         for $j = 1, 2, \ldots, n_{ee}$ do
17:             $\Gamma_j \leftarrow$ GenerateGraspModel($\langle H, W \rangle, \{p^i\}_{i=1}^m$)
18:         end for
19:         Construct the current plan space: $\Omega \leftarrow \bigcup_{j=1}^{n_{ee}} \Gamma_j$
20:         Set state $s \leftarrow \langle \Omega, \mathcal{E} \rangle$
21:         Run ILP($s, h, c, l$) and STS($s, h, c, l, k$), calculate and store plan value and plan time for both solvers
22:     end for
23: end function

FIG. 3C

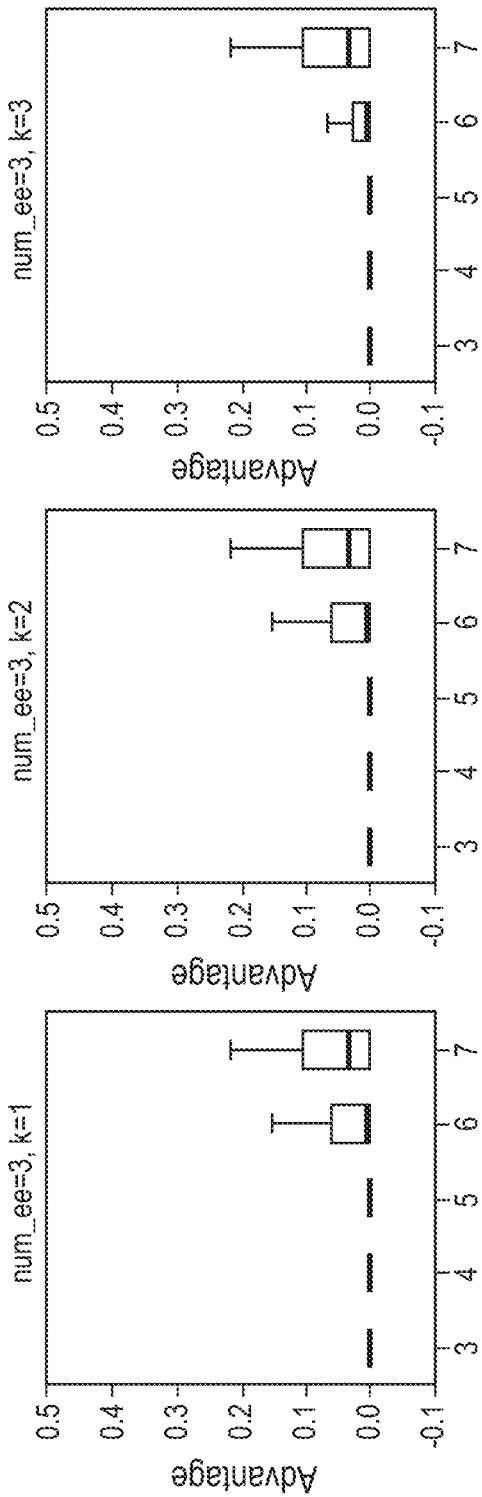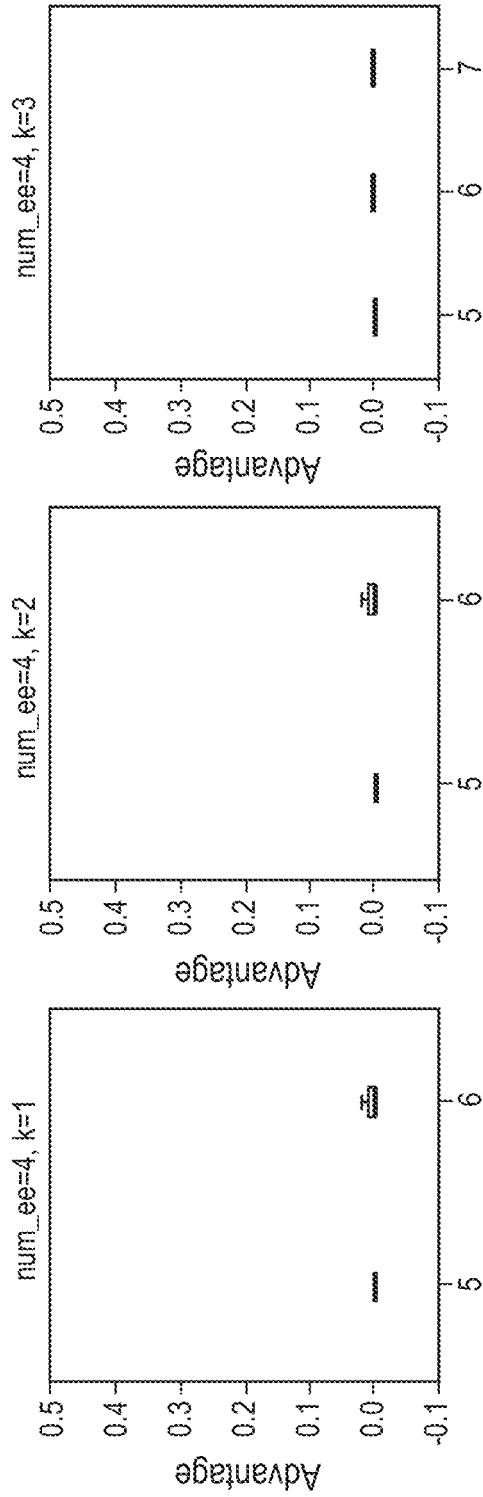

AUTOMATED ROBOTIC TOOL SELECTION

BACKGROUND

One task performed by robots is to pick objects, e.g., from a bin or shelf. Automated bin picking of arbitrary objects is a complex task, especially if those objects are highly diverse (e.g., in size, shape, and color) and are arranged irregularly. Automated bin picking has gained considerable attention from manufacturing, e-commerce order fulfillment, and warehouse automation. In order to handle a diverse range of objects, the robotic cells are often equipped with a tool changer station which allows the robot to select a new end-effector (also referred to herein as a "tool") from a set of available end-effectors (e.g., vacuum end-effectors varying in size, antipodal end-effectors) and swap it with the current one automatically in real time. In some other cases, an ambidextrous robot is equipped with a different end-effector on each arm (see Mahler et al. [2019] for an example).

The situation above is further illustrated in FIGS. 1A-1B. FIG. 1A shows an example of a tool-changer station hosting different vacuum end-effectors of various sizes; the current selection is already mounted on the robot. FIG. 1B shows an example of a bin containing an assortment of various objects. Note that the objects in the bin in FIG. 1B have different attributes, such as varying size, weight, material, and texture. While smaller vacuum end-effectors (in diameter) are naturally a better fit for tiny surfaces, larger vacuum end-effectors are proven to grasp more robustly on large surfaces and heavier objects. If a robot is to select a new end-effector to pick a particular object, the robot needs to make a decision about which end-effector to select and, if the selected end-effector is different from the current end-effector on the robot arm, the robot needs to change and swap the selected end-effector with the new one.

Tool changing, however, comes at a cost of cycle time: every time the robot decides to change the tool, it has to physically navigate the end-effector to the tool changing station and swap it with the newly-selected end effector. This swapping process will add to the cycle time, thereby having a negative impact on throughput (defined as the total time required to pick all objects divided by the number of objects picked). What is needed, therefore, and what embodiments of the present invention provide, are efficient algorithms that optimize (or otherwise increase) the throughput, and possibly also while minimizing the tool changing costs.

Optimizing tool selection is challenging due to many factors, such as the combinatorial space of bin configurations (in terms of diversity of the objects randomly packed in a bin), high dimensional visual sensory inputs, and uncertainties that are inherent in sensing and control. The disclosure herein formulates the problem as a stochastic decision making under uncertainty using a Markov Decision Process (MDP), and discloses a planning algorithm that leverages individual pre-trained end-effector grasp prediction models in a model predictive control (MPC) framework.

SUMMARY

A computer system automatically selects robot end-effectors for pick-and-place applications using a model-predictive control algorithm. The system may select an end-effector to replace an existing end-effector in order to optimize (or at least increase) throughput. The system uses a predictive model of reward, where reward of each potential grasp for each end tool is parameterized by a deep neural network. The system may also use a variety of metrics to evaluate the performance of the tool-selection algorithm, and thereby improve performance of the system.

BRIEF DESCRIPTION OF THE DRAWINGS

FIG. 3A shows an example algorithm using integer linear programming according to one embodiment of the present invention.

FIG. 3B shows an example algorithm using a sparse tree search according to one embodiment of the present invention.

FIG. 3C shows an example of pseudocode for performing synthetic experiments according to one embodiment of the present invention.

FIGS. 4A-4L shows performance results for synthetic experiments according to one embodiment of the present invention.

DETAILED DESCRIPTION

Figures 1A, 1B, 1C, 1D:
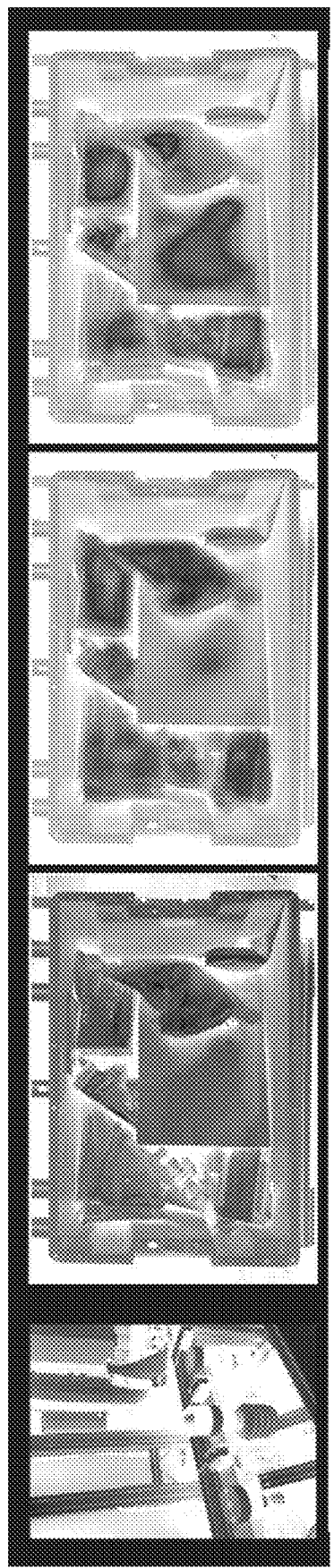
FIG. 1A shows an example of tool-changer station hosting different vacuum end-effectors of various sizes.
FIG. 1B shows an example of a bin containing an assortment of various objects.
FIG. 1C shows an example grasp score heat map for a 30 mm vacuum suction end-effector.
FIG. 1D shows an example grasp score heat map for a 50 mm vacuum suction end-effector.

Deep learning-based grasp prediction models have become an industry standard for robotic bin-picking systems. To maximize pick success, production environments are often equipped with several end-effector tools that can be swapped on-the-fly, based on the target object. Tool-change, however, takes time. Embodiments of the present invention are directed to computer-implemented systems and methods which can automatically choose the order of grasps to perform (such as that the grasps are in an ordered sequence), and the corresponding tool-change actions, to improve system throughput.

The main challenge in planning tool change is uncertainty; we typically cannot see objects in the bin that are currently occluded. Embodiments of the present invention address this problem by modeling the problem as a Markov Decision Process (MDP), where the goal is to maximize expected throughput. Embodiments of the present invention may further pursue an approximate solution based on model predictive control, where at each time step, planning is performed based only on the currently visible objects. Special to embodiments of the present invention is use of "void zones," which are geometrical boundaries in which an unknown object will be present, and therefore cannot be accounted for during planning. Embodiments of the present invention may solve the planning problem using integer linear programming (ILP). Some embodiments of the present invention use an approximate solution based on sparse tree search, which yields near-optimal performance at a fraction of the time required to solve the planning problem directly.

Another problem addressed by embodiments of the present invention is how to measure the performance of tool-change planning. Throughput alone can fail to capture delicate and smooth behavior. As a result, embodiments of the present invention provide a principled alternative to using throughput as the sole measure of performance. Finally, the description below demonstrates the operation of embodiments of the present invention on both synthetic and real world bin picking tasks.

Embodiments of the present invention include computer-implemented methods and systems for automatically selecting an end-effector for a robot and automatically swapping out the existing end-effector on the robot for the selected end-effector.

The description herein uses the term "Grasp Tool Selection Problem" (GTSP) to refer to the stochastic decision making problem of picking objects from a bin described above. Embodiments of the present invention formulate the GTSP as a Markov Decision Process (MDP). In practice, solving this MDP is difficult due to its large state space and difficult-to-estimate transition dynamics. To address this, embodiments of the present invention use an approximation of the problem which: (1) replaces the discounted horizon problem with a receding horizon Model Predictive Control (MPC); (2) in the inner planning loop of the MPC component, replaces the stochastic optimization with an approximate deterministic problem that does not require the complete knowledge of the true transition dynamics. This deterministic problem is an instance of integer linear programming (ILP), which can be solved, for example, using off-the-shelf software packages. However, embodiments of the present invention may instead use an approximate solution method based on a sparse tree search to improve the planning speed by orders of magnitude, with a negligible effect on the solution quality, and in a way that is fast enough to run in real time.

Embodiments of the present invention decouple grasp prediction learning from tool selection planning, such as by only requiring access to a set of pre-trained grasp prediction models for each individual end-effector. As a result, embodiments of the present invention may be applied ad hoc in production environments whenever such models are available. Experiments, on both synthetic and real-world environments, have demonstrated that embodiments of the present invention significantly improve system throughput when compared to heuristic selection methods.

Embodiments of the present invention also include a set of metrics for benchmarking tool selection algorithms, based on practical considerations relevant to the bin picking problem.

Having described various aspects of embodiments of the present invention at a high level of generality, certain embodiments of the present invention will now be described in more detail.

Consider a planar workspace $\mathcal{J}$, discretized into a grid of W×H points. For example, $\mathcal{J}$ could be an image of a bin containing a plurality of objects, as in FIG. 1B, where every pixel in the image maps to a potential grasp point in the robot frame. A grasp proposal evaluates the probability of succeeding in grasping at a particular point. Formally, a grasp proposal is a tuple $\omega\{\varepsilon, u, \rho\}$, where $\varepsilon$ is an end-effector, $u \in \mathcal{J}$ is a position to perform a grasp (e.g., a pixel in the image), and $0 \leq \rho \leq 1$ is the probability of a successful grasp when the end-effector $\varepsilon$ is used to perform a grasp on position u. We also use the notations $\omega^\varepsilon$, $\omega^u$, and $\omega^\rho$ when referring to individual elements of a grasp proposal $\omega$.

A grasp prediction model $\Gamma_\varepsilon: \mathcal{J} \to \{\omega_i\}_{i=1}^{W \times H}$ gives a set of grasp proposals for an input image $\mathcal{J}$ and end-effector $\varepsilon$. In practice, only a small subset of grasp proposals yield good grasps. Thus, without loss of generality, we denote $\Gamma_\varepsilon^k(\mathcal{J}) = \{\omega_i\}_{i=1}^k$, limiting the model only to the k best grasps (in terms of grasp success probability). Given a set of n end-effector grasp proposal models $\{\Gamma_i\}_{i=1}^n$, we define the grasp plan space $\Omega \cup_{i=1}^n \Gamma_i^k(\mathcal{J})$, which denotes the space of all plannable grasps. We will further denote by $\Omega_t$ the grasp plan space that is available at time t of the task. (For simplifying notations we interchangeably use $\Gamma_i$ to refer to an end-effectors grasp proposal model $\Gamma_{\varepsilon_i}$.)

Embodiments of the present invention may model the problem as a Markov Decision Process (MDP) $\mathcal{M} \equiv \langle \mathcal{S}, \mathcal{A}, \mathcal{R}, \mathcal{T} \rangle$ defined as follows: $\mathcal{S}$ is a set of states, where each $s = \langle \Omega, \varepsilon \rangle \in \mathcal{S}$ consists of the current grasp plan space and the current end-effector on the robot. (The "current" end-effector refers to the end-effector that is currently attached (also referred to as "connected") to the robot.) We denote by $s^\Omega$ and $s^\varepsilon$ the individual elements of state s. The action space $\mathcal{A} = \Omega$ is the set of all plannable grasp proposals. The reward balances pick success and tool change cost. In certain embodiments, the reward is chosen as:

$$\mathcal{R}(s, \omega) = \omega^\rho + c \mathbf{1}(s^\varepsilon \neq \omega^\varepsilon), \quad (1)$$

where $\omega^\rho$ is the grasp success score, $c < 0$ reflects a negative reward for tool changing, and $\mathbf{1}(\cdot)$ is the indicator function. The state transition function $\mathcal{T}(s_t, \omega_t, s_{t+1}) \to [0,1]$ gives the probability of observing the next state $s_{t+1}$ after executing grasp proposal $\omega_t$ in state $s_t$. As a result of performing a grasp, and depending on the grasp outcome, an object is removed from the bin and some other object randomly appears at the position of the executed grasp and new graspable positions will be exposed. In certain embodiments, the optimal policy $\pi^*: \mathcal{S} \to \Omega$ is defined as:

$$\pi^* = \operatorname*{argmax}_\pi E_\pi \left[ \sum_{t=0}^\infty \gamma^t \mathcal{R}(s_t, \omega_t) | \omega_t \sim \pi(s_t) \right]$$

Solving GTSP is difficult for at least the following reasons: (1) Prediction: we do not know the true state transitions, as they capture the future grasps that will be made possible after a grasp attempt, which effectively requires a prediction of objects in the bin that are not directly visible (see, e.g., FIG. 1B). Although several studies investigated learning visual predictive models, learning such models in production environments with a high variability of objects is not yet practical. (2) Optimization: even if the state transitions were known, the resulting MDP would have an intractable number of states, precluding the use of standard MDP optimization methods.

Embodiments of the present invention may address (1) by replacing the stochastic optimization with an approximate deterministic problem that does not require the complete knowledge of the true transitions, based on the idea of void zones. Embodiments of the present invention may address (2) by replacing the infinite horizon discounted horizon problem with an online solver, which at each time step chooses the grasp that is optimal for the next several time steps; we term this part the "model predictive control" (MPC) component. Embodiments of the present invention may, for example, use either of two computational methods for solving the short horizon problem in the inner MPC loop, either accurately, based on integer linear programming, or approximately, using a simple tree search method.

Embodiments of the present invention may seek to replace the stochastic (and unknown) transitions in GTSP by deterministic dynamics, such that the solution of the deterministic problem will yield a reasonable approximation of the true optimal controller. Such embodiments are based on the idea of a void zone, which is an area surrounding a location of one or more previous grasps. Embodiments of the present invention may not allow a grasp that is in very close proximity to any previous grasp (as defined by a void zone associated with the previous grasp(s)), as movement of objects in the bin resulting from the previous grasp attempt could render a future grasp in its close vicinity impossible.

Void zones may, for example, be implemented in accordance with the following principle: As long as the objects are sufficiently small, when a grasp is attempted, the set of grasp proposals that are sufficiently distant from the attempted grasp position will remain valid in the next state.

Figure 2A:
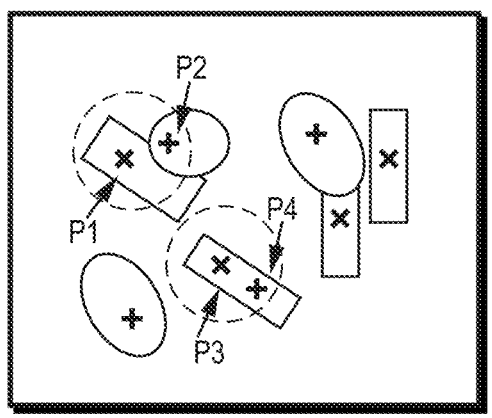
FIG. 2A shows a toy example of a bin picking problem with two end-effectors according to embodiment of the present invention.

This observation is illustrated in FIG. 2A, for a bin picking problem with two end-effectors. Grasp proposals for a first end-effector are labeled with an X, whereas grasp proposals for a second end-effector are labeled with a +. In some cases, grasp proposals lie over different objects, where one object might be partially occluding the other one (e.g., $\rho_1$ and $\rho_2$). In other cases, two or more grasp proposals might lie on the same object. In either case, performing one of the grasp proposals will invalidate some other grasp proposal and hence those proposals should not be available to the planner in the next steps.

Certain embodiments of the present invention define the void zone based on the Euclidean distance, as follows:

Definition 1. 1-separation Let $d_{i,j}=\|\omega_i^u-\omega_j^u\|$ denote the Euclidean distance on the plane between grasp proposals $\omega_i$ and $\omega_j$. A pair of grasp proposals $\langle\omega_i, \omega_j\rangle$ is called 1-separated if $d_{i,j}>1$. We refer to 1 as the void radius and use the notation $\Psi_l(\omega)$ to refer to a set of grasp proposals which are 1-separated from $\omega$. Note that by definition $\omega \notin \Psi_l(\omega)$. The void radius 1 may have any value.

Based on the above definition, we can formally define deterministic dynamics in GTSP, which we will henceforth refer to as GTSP-void. At state $s_t=\langle\Omega_t, \varepsilon_t\rangle$, taking action $\omega_t$ results in a next state, $$s_{t+1}=\langle\Omega_{t+1}, \omega_t^\varepsilon\rangle, \Omega_{t+1}=\{\omega|\omega\in\Omega_t \wedge \omega\in\Psi_l(\omega_t)\}. \quad (2)$$

That is, the end-effector in the next state is as chosen by $\omega_t$, and the grasp plan space is updated to exclude all grasp proposals within the void zone.

Figure 2B:
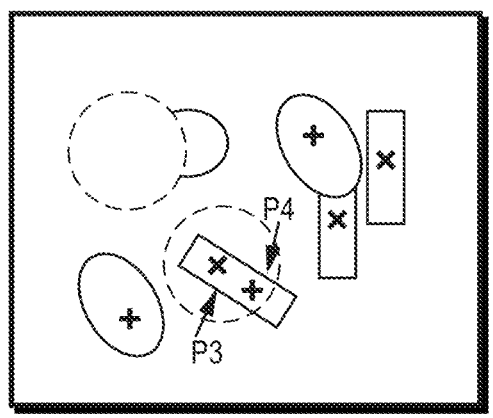
FIG. 2B illustrates an example of voiding an invalidated grasp proposal according to embodiment of the present invention.
Figure 4G:
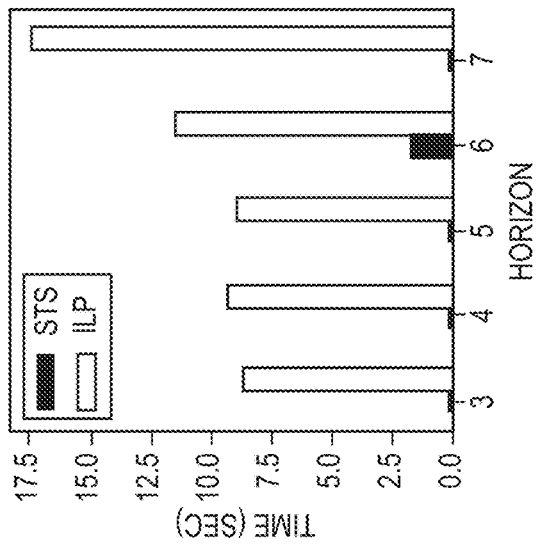
Figure 4H:
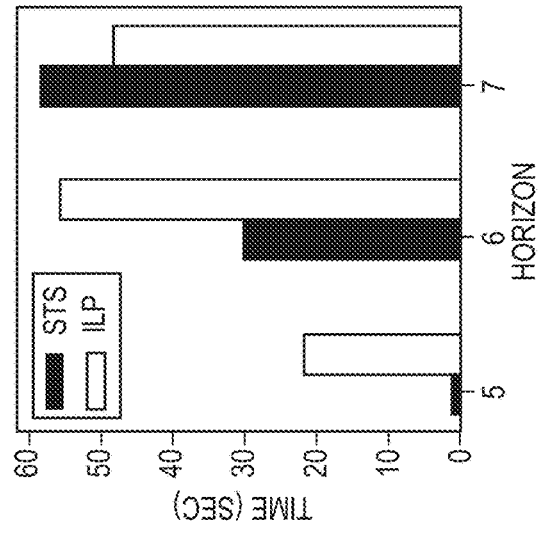
Figure 4I:
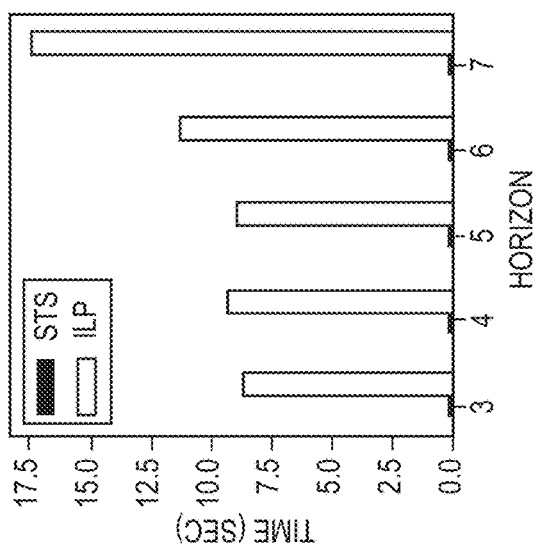
Figure 4J:
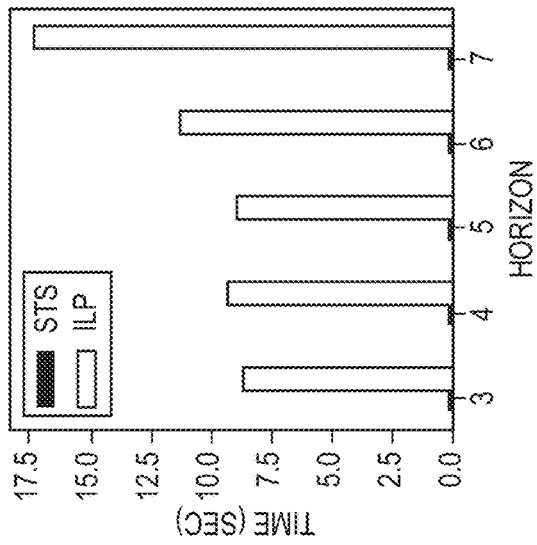
Figure 4K:
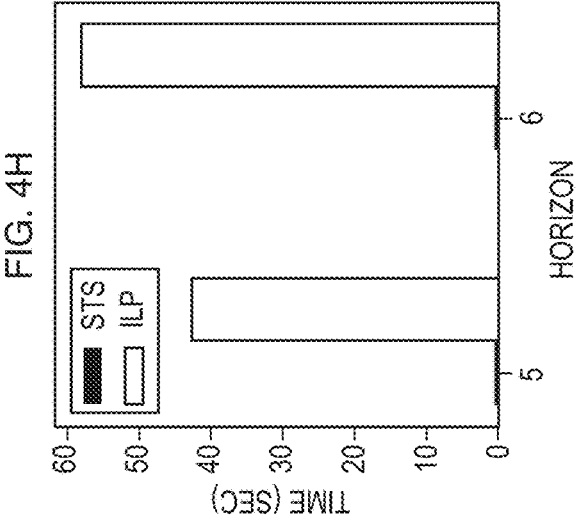
Figure 4L:
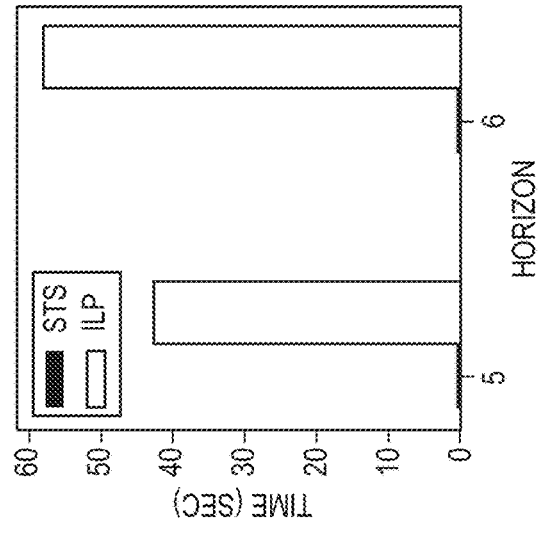

As shown in FIGS. 2A-2B, by setting the void zone large enough, embodiments of the present invention can safely ignore the local changes as a result of executing a grasp. Using void zones comes at some cost of sub-optimality—as embodiments of the present invention ignore possible future grasps inside the void zones. To mitigate this cost, embodiments of the present invention may use a model predictive control (MPC) approach. In this approach, at every step, the current observation (i.e., bin image $\mathcal{J}$) is fed to the set of pre-trained end-effector models to obtain the plan space $\Omega_t$. Next, embodiments of the present invention may solve the corresponding GTSP-void problem with some fixed horizon H, and the first step of the plan $\omega$ is executed. Pseudocode illustrating an example of this approach is provided below.

Replanning at every step allows our method to adapt to the real transitions observed in the bin. The following description explains two methods that may be used by embodiments of the present invention to solve the inner GTSP-void optimization problem within our MPC.

For example, the GTSP-void problem may be formulated as an integer linear program (ILP). To motivate this approach, note that GTSP-void with horizon H seeks to find a trajectory of H 1-separated grasp proposals in $\Omega_t$ with the highest accumulated return. This motivates us to think of the problem as a walk over a directed graph generating an elementary path (in an elementary path on a graph in which all nodes are distinct) of length H of 1-separated grasp proposals with the highest return, where the nodes of the graph are the grasp proposals in the current state, $s_t^\Omega$, and the directed edges represent the order at which the grasp proposals are executed. The formulation provided herein is mainly inspired by the ILP formulation of the well known Travelling Salesman Problem (TSP) with the following changes: (1) the main objective is modified to finding an elementary path of length h with maximal return, anywhere on the graph (as opposed to the conventional tour definition in TSP); (2) addition of the 1-separation constraints to enforce voiding; and (3) a modification of Miller-Tucker-Zemlin sub-tour elimination technique for ensuring the path does not contain any sub-tour.

Given the current state $s_t=\langle\Omega_t, \varepsilon_t\rangle$, we represent the grasp plan space as a graph $\mathcal{G}=\langle\mathcal{V}, E\rangle$ where the nodes of the graph are grasp proposals $\omega_i \in s_t^\Omega$ plus two auxiliary initial and terminal nodes $\{s, e\}$: $\mathcal{V}=\{1,|\Omega_t|\}\cup\{s, e\}$. We index the initial and terminal nodes by 1 and $|\mathcal{V}|$, respectively. For any pair of 1-separated grasp proposals $\omega_i$ and $\omega_j$ (i, j $\in \mathcal{V}$ \{s,e\}), embodiments of the present invention add directed edges $\{e_{ij}, e_{ji}\}\in E$ with a reward $r_{i,j}\rho_{\omega i}+c1(\omega_i^\varepsilon \neq \omega_j^{mcE})$ (cf. Equation 1). For such pairs of grasp proposals, embodiments of the present invention also add binary variables $\{\omega_{ij}, \omega_{ji}\}$ to ILP. Embodiments of the present invention connect the initial node s to the set of all grasp proposal nodes with reward defined as $r_{s,i}:=c1(\omega_s^\varepsilon \neq \omega_i^\varepsilon)$ and add binary variables $\omega_{si}(\forall i \in \mathcal{V}$ \{s, e\}) to ILP. Embodiments of the present invention also connect the set of all grasp proposal nodes to the terminal node e with reward $r_{i,e}\omega_i^p$, and add corresponding binary variables $\omega_{i,e}(\forall i \in \mathcal{V}$ \{s, e\}) to ILP. The optimization objective is defined as maximization $$v^* = \max_{\omega_{ij}}\sum_{\forall ij} r_{ij}\omega_{ij}$$

subject to a set of constraints that enforce an elementary path of length H.

An example of the complete ILP formulation according to one embodiment of the present invention is outlined in Algorithm 1, which is shown in FIG. 3A. The constraints in lines 2-7 are similar to a standard TSP formulation. Line 8 defines the 1-separation constraints. We denote by $\phi_i\{\omega_{j,k}|j=i\vee k=i\}$ the set of all incoming and outgoing edges of the node i. For two nodes i,j that are not 1-separated, the constraint only allows for at most one element of $\phi_i, \phi_j$ to be included in the solution. The constraints on lines 9-11 specify our adaptation of the Miller-Tucker-Zemlin sub-tour elimination technique. For each node in the graph (including the source and sink nodes) we add an integer variable $u_i$. Line 11 induces an ordering of the grasp proposals, which prevents sub-tours.

Some embodiments of the present invention use a simple alternative to ILP for approximately solving GTSP-void based on a sparse tree search (STS). In this approach, at every search step, a node is expanded using a sparse subset of available grasp proposals, which are chosen to be the top k grasp proposals per end-effector according to the grasp proposal scores $\omega^p$ (we only choose among grasp proposals that satisfy the 1-separation constraint). The parameter k—termed the sparsity factor—therefore determines the sparsity of the grasp proposals subset. Example pseudocode of one embodiment of the STS method is shown in FIG. 3B. FIG. 1C shows an example grasp score heat map for a 30 mm vacuum suction end-effector. FIG. 1D shows an example grasp score heat map for a 50 mm vacuum suction end-effector.

Having described various embodiments of the present invention, we now describe experiments that we performed in connection with embodiments of the present invention. The following discussion is divided into: (1) an investigation on synthetic problems, aimed at quantifying our algorithmic choices, and (2) a real robot study evaluating the performance of embodiments of the present invention in practice.

We first describe synthetic experiments that we performed. In the first set of experiments we conducted a comparative analysis of the two GTSP-void solvers described above. Our goal is to answer the following question: How do the ILP and STS solvers compare in terms of the optimization quality and speed?

In the first set of experiments, we crafted a synthetic tool selection problem generator as follows. (An example of pseudocode for performing the synthetic experiments in shown in FIG. 3C.) A problem instance T is generated by first selecting the number of end-effectors and then, for each end-effector, we generate a random set of grasp proposals over a fixed grid resolution H×W (we used H=70, W=110 in our experiments). (We generate grasp proposal sets directly, without requiring an image.) To generate realistic grasp proposals, we first choose n=25 random object positions, uniformly sampled on the grid.

Next, for each end-effector we generate random Gaussian kernels with randomized scale and standard deviation, centered on each object position. The resulting grasp proposal grid for each pixel gives a higher probability of success to pixels that are closer to an object center. FIG. 4 shows performance results for the synthetic experiments. The left three columns in FIG. 4 show the results for three end-effectors; the right three columns in FIG. 4 show the results for four end-effectors.

In our experiments, we report the advantage metric, defined as Adv($\mathcal{T}$)=ILP($\mathcal{T}$)−STS($\mathcal{T}$), which measures the advantage in optimization quality of ILP over STS, and the planning time, evaluated on our Python implementation of STS, and the commercial Gurobi ILP solver, using MacBook Pro 2.8 GHz Quad-Core Intel Core i7 hardware. We used a fixed void radius l=20 and swap cost c=−0.2, and report results over n=100 random problem instances as defined above.

In terms of quality, we observed STS to perform as well as ILP or just marginally worse. In terms of planning speed, STS is orders of magnitude faster, except for the case of 4 end effectors and a low sparsity k=3. Yet, we observe that even in this setting, reducing k significantly improves speed with a negligible effect on quality.

In the second set of experiments, we conducted experiments to evaluate the performance of various grasp tool selection algorithms, and to validate the adequacy of the proposed tool changing score in capturing efficiency. First, we compare the MPC-STS with a set of heuristic baselines. Next, we compare the performance of MPC-STS and heuristics baselines against experiments where only a single end-effector was used (no tool changing allowed). We also conduct a series of ablations on MPC-STS in terms of its void radius and max horizon (i.e., H). Before we present our results, we first discuss how real-world performance should be best evaluated.

As the synthetic results indicated that STS is much faster than ILP, yet suffers a negligible loss in performance, STS may be an advantageous choice in at least some circumstances. Before we present our results, we first discuss how real-world performance should be best evaluated by providing the following metric definitions.

Our primary goal is to minimize the cost associated with changing tools, yet still maximize pick success. One way to measure performance is by grasp throughput—the average number of successful picks in a unit time. However, grasp throughput does not correctly penalize strategies that execute many failed grasps quickly, which can be inappropriate for scenarios where items may become damaged as a result of repeated, aggressive picking.

To address this, we propose a combined score based on pick success rate (PSR), and tool consistency rate (TCR), defined as:

$$PSR = \frac{PS}{PA}, TCR = 1 - \frac{TC}{PA},$$

where PS is the pick success count, PA is the pick attempt count, and TC is the tool change count (here, we do assume that there is no more than one tool change per pick attempt). Ideally, we would like both scores to be high. Also, the PSR and TCR should be balanced according to the time cost of tool change compared to the time cost of a failed grasp. We posit that the following β-TC-score score captures these desiderata, $$\beta - TC - \text{score} = \frac{(1 + \beta^2) * PSR * TCR}{\beta^2 PSR + TCR},$$

where β is analogous to an F-beta score. We recommend that β be set to the opportunity cost of a single tool change—the approximate number of successful picks that could have been completed in the time it takes to execute a tool change. For our setup, we estimated β to be 0.33.

In our experimental setup, we used a Fanuc LRMate 200iD/7L arm, with a tool selection hardware using two vacuum end-effectors: Piab BL30-3P.4L.04AJ (30 mm) and Piab BL50-2.10.05AD (50 mm). We used an assortment of mixed items (various sizes, weights, shapes, colors, etc.). Each end-effector is associated with a grasp proposal model trained using previously collected production data appropriate for that end-effector. Embodiments of the grasp proposal models disclosed herein include encoder-decoder convolutional neural nets including a feature pyramid network on a ResNet-101 backbone and a pixelwise sigmoidal output of volume W×H, where W×H are the dimensions of the grasp success probabilities $\Gamma_\varepsilon$. The network is then trained end-to-end using previously collected grasp success/failure data consisting of 5 k grasp data per end-effector using stochastic gradient descent with momentum (LR=0.0003; p=0.8). Following the synthetic experiments conclusion, we only used the STS solver.

The feature extractor is pretrained on the MS-COCO detection task, then the full network (feature extractor with the sigmoidal output head) is trained using stochastic gradient descent with momentum (LR=0.0003; p=0.8). To compensate for the sparsity of the pixelwise success signal, we also conduct random sampling of background pixels and include their negative signals in training. Pixels are proposed from the output volume using Boltzmann sampling (kT=0.01).

TABLE 1

Performance comparison over different tool selection algorithms. PS/hr is the throughput.

| Algorithm (w/30 mm + 50 mm) | TC | PA | PS | TC-Score ($\beta$ = 0.33) | PS/hr |
|---|---|---|---|---|---|
| Randomized | 800 | 2191 | 744 | 0.3558 | 186 |
| Naive Greedy | 733 | 2093 | 1268 | 0.6099 | 317 |
| Greedy | 261 | 2702 | 1288 | 0.4999 | 295.41 |
| MPC-STS | 229 | 2563 | 1719 | 0.6885 | 429.75 |

Table 1, above, compares the MPC-STS method of embodiments of the present invention with three baselines. The first is a randomized selector, which randomly changes tools with probability p=0.75 at each step, and forces a change if not swapped after 10 steps. The second baseline is naive greedy selector, which chooses the next grasp proposal based on one-step reward function (see Equation 1). The third baseline is greedy selector, which accumulates the top n=5 likelihood scores for each tool, and selects the tool with the highest sum. Our MPC-STS selector was configured with a void radius of l=100 mm (roughly 60 pixels), a maximum of 10 initial grasp proposal samples per end-effector, sparsity factor k=2, and a max horizon of H=2 (since it yielded the best results for MPC-STS in this domain based on the ablation results in Table 4). Observe that MPC-STS significantly outperforms the other baselines in terms of both TC-score and pick success rate per hour (improving over the best baseline by 50%).

Comparisons with a single end-effector will now be described. This set of comparisons is based on a separate set of shorter experimental runs with similar items; results are reported in Table 2. Here, note the divergence between the TC-score and the throughput (PS/hr) in the ordering of the performance of the single 50 mm end-effector and the naive greedy baseline.

TABLE 2

Comparison of single end-effector performance vs multiple end-effectors and tool selection.

| Configuration | TC | PA | PS | TC-Score ($\beta$ = 0.33) | PS/hr |
|---|---|---|---|---|---|
| Single (30 mm) | 0 | 745 | 35 | 0.508 | 287.2 |
| Single (50 mm) | 0 | 864 | 572 | 0.685 | 490.3 |
| Naive Greedy (30 mm + 50 mm) | 217 | 636 | 465 | 0.751 | 348.8 |
| MPC-STS (30 mm + 50 mm) | 71 | 691 | 524 | 0.770 | 507.1 |

While the throughput for the single 50 mm strategy is higher, the TC-score correctly reflects that this strategy is less pick efficient. Indeed, the successful pick percentage for the 50 mm strategy is 66% while the successful pick percentage for the naive greedy strategy is 73%. The throughput in this case is inflated by executing failing picks quickly. changing score correctly does not. As expected, MPC-STS outperforms all the baselines.

Experiments were also performed in relation to void radius and max horizon. These experiments are reported in Tables 3 and 4.

TABLE 3

Investigation of void radius l (in mm).

| MPC-STS (H = 3, k = 2) | TC | PA | PS | TC-Score ($\beta$ = 0.33) | PS/hr |
|---|---|---|---|---|---|
| l = 50 mm | 72 | 720 | 586 | 0.822 | 540.9 |
| l = 100 mm | 58 | 649 | 431 | 0.682 | 417.1 |
| l = 150 mm | 98 | 619 | 409 | 0.675 | 348.8 |

TABLE 4

Investigation of planning horizon.

| MPC-STS (k = 2, l = 100 mm) | TC | PA | PS | TC-Score ($\beta$ = 0.33) | PS/hr |
|---|---|---|---|---|---|
| H = 1 | 64 | 712 | 522 | 0.747 | 481.8 |
| H = 2 | 60 | 653 | 511 | 0.793 | 502.6 |
| H = 3 | 58 | 649 | 431 | 0.682 | 417.1 |
| H = 5 | 65 | 646 | 365 | 0.586 | 353.2 |

On our item set, increasing the size of the void radius leads to a decrease in tool-changing efficiency and overall throughput at an MPC-STS with H=3. As the tree search progresses, the bin becomes increasingly voided. For large void radii, a large fraction of the bin will be voided, leading to unreliable reward estimates.

Thus, as long as the void radius is large enough to cover areas disturbed by previous picks, the smaller radius the better. We also see that increasing the max horizon H from 1 to 2 leads to an increase in performance, but thereafter there is a decrease in performance metrics even though the overall tool change count remains similar. We conjecture that this is due to the crude approximation of the deterministic dynamics, which are not reliable for a long planning horizon.

In some embodiments, the techniques described herein relate to a method, performed by a computer, for use with a plurality of grasp prediction models having a one-to-one correspondence with a plurality of end-effectors, the method including: (A) identifying an end-effector currently attached to a robot; (B) identifying, based on an input image, a plurality of objects to be grasped by the robot; (C) selecting, using a Markov Decision Process (MDP) based on the plurality of grasp prediction models, a plurality of grasps for grasping the plurality of objects, wherein the plurality of grasps are in an ordered sequence; and (D) selecting, for each of the plurality of grasps, a corresponding end-effector.

The MDP may include a set of reward balances which balances pick success and end-effector change cost.

The method may further include: (E) identifying a first grasp in the ordered sequence; (F) identifying the end-effector corresponding to the first grasp; (G) determining whether the end-effector currently attached to the robot differs from the end-effector corresponding to the first grasp; and (H) in response to determining that the end-effector currently attached to the robot differs from the end-effector corresponding to the first grasp: (H)(1) detaching the end-effector currently attached to the robot from the robot; and (H)(2) automatically attaching, to the robot, the end-effector corresponding to the first grasp.

Operations (H)(1) and/or (H)(2) may be performed automatically. Operations (H)(1) and (H)(2) may be performed automatically using a single tool-changer mechanism.

Each of the plurality of grasp prediction models may provide, based on a given image and the end-effector corresponding to the grasp prediction model, a plurality of grasp proposals, wherein each of the plurality of grasp proposals identifies: the end-effector corresponding to the grasp prediction model, a pixel in the given image, and a probability of a successful grasp when the end-effector corresponding to the grasp prediction model is used to attempt a grasp at a location corresponding to the pixel in the given image.

Operation (C) may include: (C)(1) for each of the plurality of grasp prediction models, evaluating the grasp prediction model at each of a plurality of pixels in the input image to generate a success probability score corresponding to that grasp prediction model and that pixel; and (C)(2) identifying, for each of the plurality of grasp prediction models, k pixel positions in the image having the k highest success probability scores for that grasp prediction model, where k>1.

Operation (C) may include selecting the plurality of grasps by solving an approximation of the Markov Decision Process (MDP).

Solving the approximation of the MDP may include solving the approximation of the MDP based only on objects that are visible in the input image. Solving the approximation of the MDP may include solving the approximation of the MDP using Integer Linear Programming (ILP). Solving the approximation of the MDP may include solving the approximation of the MDP using a sparse tree search.

Operation (C) may include, at each of a plurality of time steps, selecting a grasp that is optimal for at least one next time step.

Operation (C) may include: (C)(1) selecting a first grasp in the ordered sequence of the plurality of grasps; (C)(2) defining a void zone, the void zone including an area surrounding a location of the first grasp; and (C)(3) selecting a second grasp in the ordered sequence of the plurality of grasps, wherein selecting the second grasp includes excluding the void zone from consideration when selecting the second grasp, wherein the second grasp has a location that is not in the void zone.

In some embodiments, the techniques described herein relate to a system for use with a plurality of grasp prediction models having a one-to-one correspondence with a plurality of end-effectors, the system including at least one non-transitory computer-readable medium having computer program instructions stored thereon, the computer program instructions being executable by at least one computer processor to perform a method, the method including: (A) identifying an end-effector currently attached to a robot; (B) identifying, based on an input image, a plurality of objects to be grasped by the robot; (C) selecting, using a Markov Decision Process (MDP) based on the plurality of grasp prediction models, a plurality of grasps for grasping the plurality of objects, wherein the plurality of grasps are in an ordered sequence; and (D) selecting, for each of the plurality of grasps, a corresponding end-effector.

The MDP may include a set of reward balances which balances pick success and end-effector change cost.

The method may further include: (E) identifying a first grasp in the ordered sequence; (F) identifying the end-effector corresponding to the first grasp; (G) determining whether the end-effector currently attached to the robot differs from the end-effector corresponding to the first grasp; and (H) in response to determining that the end-effector currently attached to the robot differs from the end-effector corresponding to the first grasp: (H)(1) detaching the end-effector currently attached to the robot from the robot; and (H)(2) automatically attaching, to the robot, the end-effector corresponding to the first grasp.

Operations (H)(1) and/or (H)(2) may be performed automatically. Operations (H)(1) and (H)(2) may be performed automatically using a single tool-changer mechanism.

Each of the plurality of grasp prediction models may provide, based on a given image and the end-effector corresponding to the grasp prediction model, a plurality of grasp proposals, wherein each of the plurality of grasp proposals identifies: the end-effector corresponding to the grasp prediction model, a pixel in the given image, and a probability of a successful grasp when the end-effector corresponding to the grasp prediction model is used to attempt a grasp at a location corresponding to the pixel in the given image.

Operation (C) may include: (C)(1) for each of the plurality of grasp prediction models, evaluating the grasp prediction model at each of a plurality of pixels in the input image to generate a success probability score corresponding to that grasp prediction model and that pixel; and (C)(2) identifying, for each of the plurality of grasp prediction models, k pixel positions in the image having the k highest success probability scores for that grasp prediction model, where k>1.

Operation (C) may include selecting the plurality of grasps by solving an approximation of the Markov Decision Process (MDP).

Solving the approximation of the MDP may include solving the approximation of the MDP based only on objects that are visible in the input image. Solving the approximation of the MDP may include solving the approximation of the MDP using Integer Linear Programming (ILP). Solving the approximation of the MDP may include solving the approximation of the MDP using a sparse tree search.

Operation (C) may include, at each of a plurality of time steps, selecting a grasp that is optimal for at least one next time step.

Operation (C) may include: (C)(1) selecting a first grasp in the ordered sequence of the plurality of grasps; (C)(2) defining a void zone, the void zone including an area surrounding a location of the first grasp; and (C)(3) selecting a second grasp in the ordered sequence of the plurality of grasps, wherein selecting the second grasp includes excluding the void zone from consideration when selecting the second grasp, wherein the second grasp has a location that is not in the void zone.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the neural networks used by embodiments of the present invention may be applied to datasets containing millions of elements and perform up to millions of calculations per second. It would not be feasible for such algorithms to be executed manually or mentally by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method, performed by a computer, for use with at least one grasp prediction model for evaluating grasps for a plurality of end-effectors, wherein the at least one grasp prediction model comprises at least one neural network trained using grasp success/failure data, the method comprising:
 (A) storing, in a computer memory, data indicating which end-effector is currently attached to a robot;
 (B) identifying, based on an input image, a plurality of objects to be grasped by the robot, comprising identifying a plurality of locations in the input image;
 (C) selecting, using a Markov Decision Process (MDP) based on outputs from the at least one grasp prediction model, a plurality of grasps for grasping the plurality of objects,
   wherein the plurality of grasps are in an ordered sequence; and
   wherein the MDP includes a reward function which balances pick success and end-effector change cost; and (D) for each of the plurality of grasps in the ordered sequence:
  selecting a corresponding end-effector; and
  automatically attaching the selected end-effector to the robot.

2. The method of claim 1, wherein (D) comprises:
(D)(1) identifying a first grasp in the ordered sequence;
(D)(2) identifying the end-effector corresponding to the first grasp;
(D)(3) determining whether the end-effector currently attached to the robot differs from the end-effector corresponding to the first grasp; and
(D)(4) in response to determining that the end-effector currently attached to the robot differs from the end-effector corresponding to the first grasp:
  (D)(4)(a) detaching the end-effector currently attached to the robot from the robot; and
  (D)(4)(b) automatically attaching, to the robot, the end-effector corresponding to the first grasp.

3. The method of claim 2, wherein (D)(4)(a) and (D)(4)(b) are performed automatically.

4. The method of claim 3, wherein (D)(4)(a) and (D)(4)(b) are performed automatically using a single tool-changer mechanism.

5. The method of claim 1, wherein the at least one grasp prediction model provides, based on a given image and the end-effector corresponding to the grasp prediction model, a plurality of grasp proposals, wherein each of the plurality of grasp proposals identifies:
  the end-effector corresponding to the grasp prediction model,
  a pixel in the given image, and
  a probability of a successful grasp when the end-effector corresponding to the grasp prediction model is used to attempt a grasp at a location corresponding to the pixel in the given image.

6. The method of claim 1, wherein (C) comprises:
(C)(1) for each of the plurality of grasp prediction models, evaluating the grasp prediction model at each of a plurality of pixels in the input image to generate a success probability score corresponding to that grasp prediction model and that pixel; and
(C)(2) identifying, for each of the plurality of grasp prediction models, k pixel positions in the image having the k highest success probability scores for that grasp prediction model, where k>1.

7. The method of claim 1, wherein (C) comprises selecting the plurality of grasps by solving an approximation of the Markov Decision Process (MDP).

8. The method of claim 7, wherein solving the approximation of the MDP comprises solving the approximation of the MDP based only on objects that are visible in the input image.

9. The method of claim 7, wherein solving the approximation of the MDP comprises solving the approximation of the MDP using Integer Linear Programming (ILP).

10. The method of claim 7, wherein solving the approximation of the MDP comprises solving the approximation of the MDP using a sparse tree search.

11. The method of claim 1, wherein (C) comprises, at each of a plurality of time steps, selecting a grasp that is optimal for at least one next time step.

12. The method of claim 1, wherein (C) comprises:
(C)(1) selecting a first grasp in the ordered sequence of the plurality of grasps;
(C)(2) defining a void zone, the void zone comprising an area surrounding a location of the first grasp; and
(C)(3) selecting a second grasp in the ordered sequence of the plurality of grasps, wherein selecting the second grasp comprises excluding the void zone from consideration when selecting the second grasp, wherein the second grasp has a location that is not in the void zone.

13. A system for use with at least one grasp prediction model for evaluating grasps for a plurality of end-effectors, wherein the at least one grasp prediction model comprises at least one neural network trained using grasp success/failure data, the system comprising at least one non-transitory computer-readable medium having computer program instructions stored thereon, the computer program instructions being executable by at least one computer processor to perform a method, the method comprising:
(A) storing, in a computer memory, data indicating which end-effector is currently attached to a robot;
(B) identifying, based on an input image, a plurality of objects to be grasped by the robot, comprising identifying a plurality of locations in the input image;
(C) selecting, using a Markov Decision Process (MDP) based on outputs from the at least one grasp prediction model, a plurality of grasps for grasping the plurality of objects,
  wherein the plurality of grasps are in an ordered sequence; and
  wherein the MDP includes a reward function which balances pick success and end-effector change cost; and
(D) for each of the plurality of grasps in the ordered sequence:
  selecting a corresponding end-effector; and
  automatically attaching the selected end-effector to the robot.

14. The system of claim 13, wherein the (D) comprises:
(D)(1) identifying a first grasp in the ordered sequence;
(D)(2) identifying the end-effector corresponding to the first grasp;
(D)(3) determining whether the end-effector currently attached to the robot differs from the end-effector corresponding to the first grasp; and
(D)(4) in response to determining that the end-effector currently attached to the robot differs from the end-effector corresponding to the first grasp:
  (D)(4)(a) detaching the end-effector currently attached to the robot from the robot; and
  (D)(4)(b) automatically attaching, to the robot, the end-effector corresponding to the first grasp.

15. The system of claim 14, wherein (D)(4)(a) and (D)(4)(b) are performed automatically.

16. The system of claim 15, wherein (D)(4)(a) and (D)(4)(b) are performed automatically using a single tool-changer mechanism.

17. The system of claim 13, wherein the at least one grasp prediction model provides, based on a given image and the end-effector corresponding to the grasp prediction model, a plurality of grasp proposals, wherein each of the plurality of grasp proposals identifies:
  the end-effector corresponding to the grasp prediction model,
  a pixel in the given image, and
  a probability of a successful grasp when the end-effector corresponding to the grasp prediction model is used to attempt a grasp at a location corresponding to the pixel in the given image.

18. The system of claim 13, wherein (C) comprises:
(C)(1) for each of the plurality of grasp prediction models, evaluating the grasp prediction model at each of a plurality of pixels in the input image to generate a success probability score corresponding to that grasp prediction model and that pixel; and (C)(2) identifying, for each of the plurality of grasp prediction models, k pixel positions in the image having the k highest success probability scores for that grasp prediction model, where k>1.

19. The system of claim 13, wherein (C) comprises selecting the plurality of grasps by solving an approximation of the Markov Decision Process (MDP).

20. The system of claim 19, wherein solving the approximation of the MDP comprises solving the approximation of the MDP based only on objects that are visible in the input image.

21. The system of claim 19, wherein solving the approximation of the MDP comprises solving the approximation of the MDP using Integer Linear Programming (ILP).

22. The system of claim 19, wherein solving the approximation of the MDP comprises solving the approximation of the MDP using a sparse tree search.

23. The system of claim 13, wherein (C) comprises, at each of a plurality of time steps, selecting a grasp that is optimal for at least one next time step.

24. The system of claim 13, wherein (C) comprises:
(C)(1) selecting a first grasp in the ordered sequence of the plurality of grasps;
(C)(2) defining a void zone, the void zone comprising an area surrounding a location of the first grasp; and
(C)(3) selecting a second grasp in the ordered sequence of the plurality of grasps, wherein selecting the second grasp comprises excluding the void zone from consideration when selecting the second grasp, wherein the second grasp has a location that is not in the void zone.

* * * * *